United States Patent
Kim

(10) Patent No.: US 6,725,309 B1
(45) Date of Patent: Apr. 20, 2004

(54) MULTISTAGE INTERRUPT CONTROLLER FOR RECEIVING A PLURALITY OF INTERRUPT SIGNALS TO GENERATE A PRIORITY INTERRUPT SIGNAL

(75) Inventor: Bong Kyun Kim, Seoul (KR)

(73) Assignee: Hyundai Electronics Industries Co., Ltd., Ichon-Shi (KR)

( * ) Notice: Subject to any disclaimer, the term of this patent is extended or adjusted under 35 U.S.C. 154(b) by 0 days.

(21) Appl. No.: 09/515,625

(22) Filed: Feb. 29, 2000

(30) Foreign Application Priority Data

Mar. 3, 1999 (KR) ............................................ 1999-6990

(51) Int. Cl.[7] ............................................ G06F 13/24
(52) U.S. Cl. ...................................... 710/260; 710/264
(58) Field of Search ............................ 710/262, 8, 312, 710/260, 264, 68, 113, 107, 266, 116, 263

(56) References Cited

U.S. PATENT DOCUMENTS

| | | | | |
|---|---|---|---|---|
| 4,498,136 A | * | 2/1985 | Sproul, III | .................. 710/262 |
| 4,805,096 A | * | 2/1989 | Crohn | ......................... 710/260 |
| 5,218,703 A | * | 6/1993 | Fleck et al. | .................. 710/264 |
| 5,410,710 A | * | 4/1995 | Sarangdhar et al. | ........ 710/266 |
| 5,481,729 A | * | 1/1996 | Shibuya et al. | .............. 710/264 |
| 5,717,932 A | * | 2/1998 | Szczepanek et al. | ........ 710/260 |
| 5,905,897 A | * | 5/1999 | Chou et al. | .................. 710/260 |
| 5,943,507 A | * | 8/1999 | Cornish et al. | ............... 710/48 |

* cited by examiner

Primary Examiner—Khanh Dang
Assistant Examiner—Kim T. Huynh
(74) Attorney, Agent, or Firm—Fleshner & Kim, LLP

(57) ABSTRACT

A multistage interrupt controller provides a multistage storage means that processes external interrupt signals, including a plurality of multistage interrupt reception registers that can receive and provide temporary storage for corresponding external interrupt signals, an interrupt priority determining circuit that can receive the external interrupt signals from the multistage interrupt reception registers, determine priorities of the external interrupt signals, and dispose of the external interrupt signals according to the priorities, and a logical operator that inverts signals generated by the corresponding multistage interrupt reception registers and provides a logical feedback signal to the multistage interrupt reception registers.

15 Claims, 4 Drawing Sheets

MULTISTAGE INTERRUPT CONTROLLER FOR RECEIVING A PLURALITY OF INTERRUPT SIGNALS TO GENERATE A PRIORITY INTERRUPT SIGNAL

BACKGROUND OF THE INVENTION

1. Field of the Invention

The present invention relates to an interrupt controller that processes external interrupt signals, and more particularly, to a multistage interrupt controller that uses a multistage storage means to process the external interrupt signals.

2. Background of the Related Art

FIG. 1 illustrates a related art single stage interrupt controller. The related art single stage interrupt controller includes a plurality of interrupt reception registers 1, 2, 3 that receive and temporarily store a plurality of external interrupt signals EXTINT0, EXTINT1, EXTINT2, respectively. An interrupt priority determining circuit 4 receives the delayed external interrupt signals IFR0, IFR1, IFR2 from the interrupt reception registers 1, 2, 3, respectively, determines priorities and processes the delayed external interrupt signals IFR0, IFR1, IFR2. A corresponding plurality of accept signals AcceptINT0, AcceptINT1, AcceptINT2 are then generated and transmitted to the respective interrupt reception registers 1, 2, 3, to indicate final interrupt execution.

The interrupt reception registers 1, 2, 3 each include a first AND gate 5 that subjects the external interrupt signal (e.g., EXTINT0) and the inverted accept signal (e.g., AcceptINT0) to a logical AND operation. Each of the interrupt registers 1, 2, 3 also includes a second AND gate 6 that subjects in external clock signal CLK and an inverted feedback signal to a logical AND operation, and a D-flip-flop 7 that delays a signal from the first AND gate 5 for a given time period in accordance with the external clock signal CLK from the second AND gate 6.

The D-flip-flop 7 provides the delayed external interrupt signal (e.g., IFR0) both to the interrupt priority determining circuit 4 and to the second AND gate 6 as the feedback signal. The D-flip-flop 7 can be reset in response to an external reset signal RESET.

The related art single stage interrupt controller receives the external interrupt signals EXTINT0, EXTINT1, EXTINT2, the clock signal CLK, the reset signal RESET, and the accept signals AcceptINT0, AcceptINT1, AcceptINT2 indicating that an interrupt has been executed at the interrupt reception registers 1, 2, 3. Accordingly, the external interrupt signals EXTINT0, EXTINT1, EXTINT2 are synchronized with the clock signal CLK and transmitted to the interrupt priority determining circuit 4 through the interrupt reception registers 1, 2, 3. The interrupt priority determining circuit 4 then generates interrupt signals according to the priority of the delayed external interrupt signals IFR0, IFR1, IFR2.

Upon generation and transmission of the interrupt signal from the interrupt priority determining circuit 4, a device that receives the interrupt signal transits the accept signal AcceptINT0, AcceptINT1, or AcceptINT2 to a "high" position. Once the accept signal is transited to the "high" position, the first AND gate 5 in each of the interrupt reception registers 1, 2,3 generates a "low" signal. The D-flip-flop 7 accordingly generates a "low" delayed external interrupt signal (e.g., IFR0) output to the interrupt priority determining circuit 4, and no external interrupt signal (e.g., EXTINT0) is received at the interrupt priority determining circuit 4. Table 1 shows the cyclic operation of the related art single stage interrupt controller.

TABLE 1

| | CYCLE | | | | | | | | |
|---|---|---|---|---|---|---|---|---|---|
| | 1 | 2 | 3 | 4 | 5 | 6 | 7 | 8 | 9 |
| EXTINT0 | 0 | 1 | 0 | 0 | 0 | 0 | 0 | 0 | 0 |
| EXTINT1 | 0 | 1 | 0 | 0 | 0 | 0 | 0 | 0 | 0 |
| EXTINT2 | 0 | 1 | 0 | 0 | 0 | 0 | 0 | 0 | 0 |
| IFR0 | 0 | 0 | 1 | 1 | 0 | 0 | 0 | 0 | 0 |
| IFR1 | 0 | 0 | 1 | 1 | 1 | 1 | 0 | 0 | 0 |
| IFR2 | 0 | 0 | 1 | 1 | 1 | 1 | 1 | 1 | 0 |
| AcceptINT0 | 0 | 0 | 0 | 1 | 0 | 0 | 0 | 0 | 0 |
| AcceptINT1 | 0 | 0 | 0 | 0 | 0 | 1 | 0 | 0 | 0 |
| AcceptINT2 | 0 | 0 | 0 | 0 | 0 | 0 | 0 | 1 | 0 |

If the external interrupt signals EXTINT0, EXTINT1, EXTINT2 are received at a logic level of "1", each of the interrupt reception registers 1, 2, 3 generates an external interrupt signal IFR0, IFR1, IFR2 at a logic level of "1". Further, if the priorities are EXTINT0>EXTINT1>EXTINT2, the interrupt priority determining circuit 4 generates the interrupt signals in the order shown in Table 1. Once the interrupt signal is generated, a corresponding accept signal AcceptINT0, AcceptINT1, AcceptINT2 is transited to a logic level of "1" to generate a corresponding delayed external interrupt signal IFR0, IFR1, IFR2 at a logic level of "0".

However, the related art interrupt controller has various problems and disadvantages. Since the related art single stage interrupt controller has interrupt flag registers of only one stage, the interrupt controller cannot issue an interrupt signal in multistage, because the interrupt signal is not received, stored, and processed again but it is disregarded, even if an external interrupt signal is received again when the interrupt flag register is at a logic level of "1". As illustrated in FIG. 2, which illustrates waveforms at different units in the related art interrupt controller, even if the external interrupt signals are duplicated, a subsequent external interrupt signal is disregarded while the delayed external interrupt signal (e.g., IFRO) is at a "high" level.

SUMMARY OF THE INVENTION

An object of the invention is to solve at least the above problems and/or disadvantages and to provide at least the advantages described hereinafter.

It is a further object of the present invention to recognize subsequent external interrupt signals.

Another object of the present invention is to provide a multistage interrupt controller that can issue interrupt signals in multistage.

To achieve these and other advantages, the multistage interrupt controller includes a plurality of multistage interrupt reception registers, each receiving and storing a plurality of interrupt signals to generate a priority interrupt signal. The multistage interrupt controller also includes an interrupt priority determining circuit coupled to said plurality of multistage interrupt reception registers for receiving corresponding priority interrupt signals, determining priorities of the priority interrupt signals, and generating an output signal in accordance with the priorities. Further, the multistage interrupt controller includes a feedback circuit that receives the priority interrupt signals from the multistage interruption registers to generate a feedback signal to each of the plurality of multistage interrupt reception registers.

The embodiments of the present invention also include a method for generating an interrupt signal that comprises the steps of sequentially delaying a plurality of interrupt signals in response to a feedback signal and a synchronization signal, generating a corresponding plurality of priority interrupt signals; and prioritizing the priority output signals to generate a prioritized interrupt signal.

The embodiments of the present invention further include a multistage interruption register, comprising a plurality of stages coupled in series, wherein each stage receives a feedback signal, and at least one of an interrupt signal and at least one delayed interrupt signal, and a last stage of the plurality of stages generates a priority interrupt signal, and a feedback circuit responsive to the priority interrupt signal generates the feedback signal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements, and wherein.

DETAILED DESCRIPTION OF PREFERRED EMBODIMENTS

Figure 1:
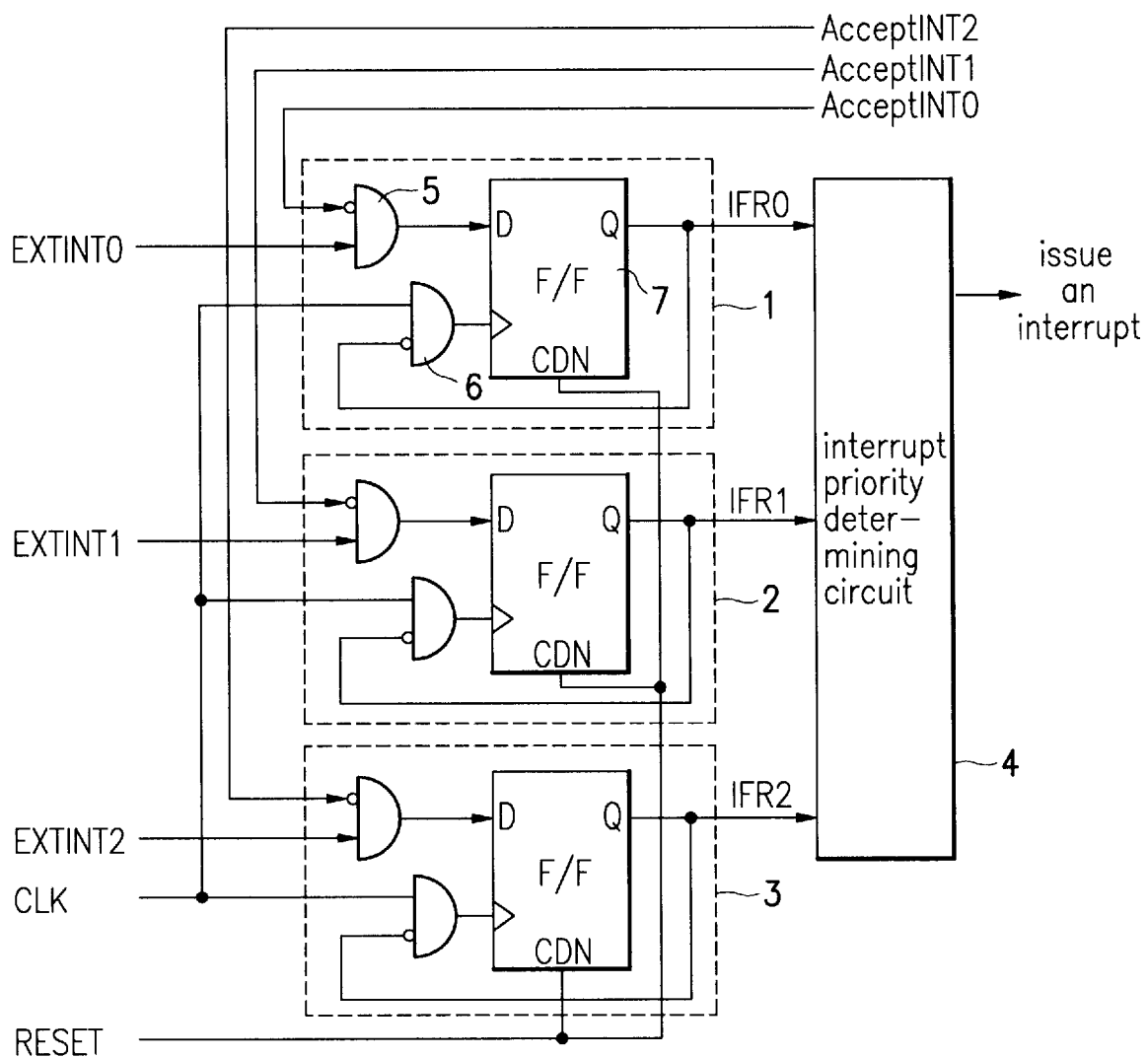
FIG. 1 illustrates a related art interrupt controller.
Figure 2:
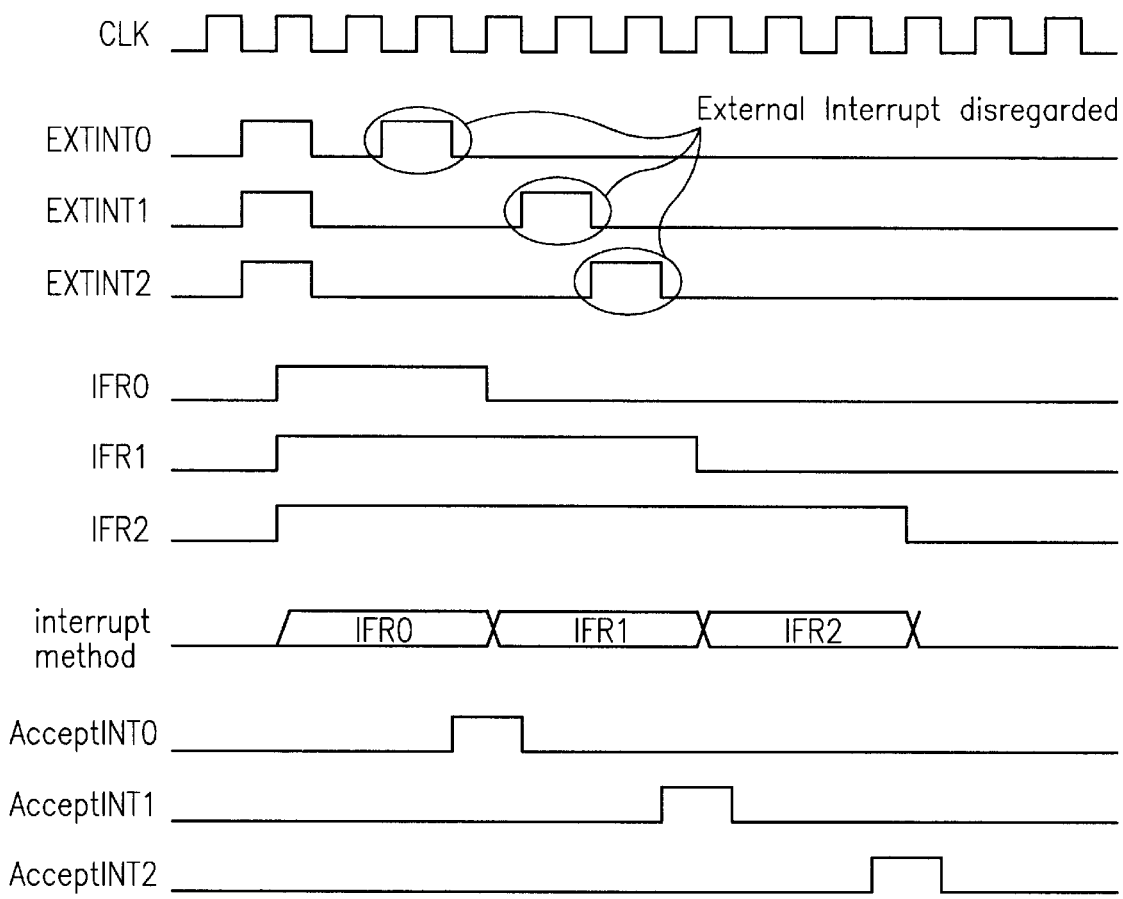
FIG. 2 illustrates a comparison of waveforms at different outputs of the related art interrupt controller.
Figure 3:
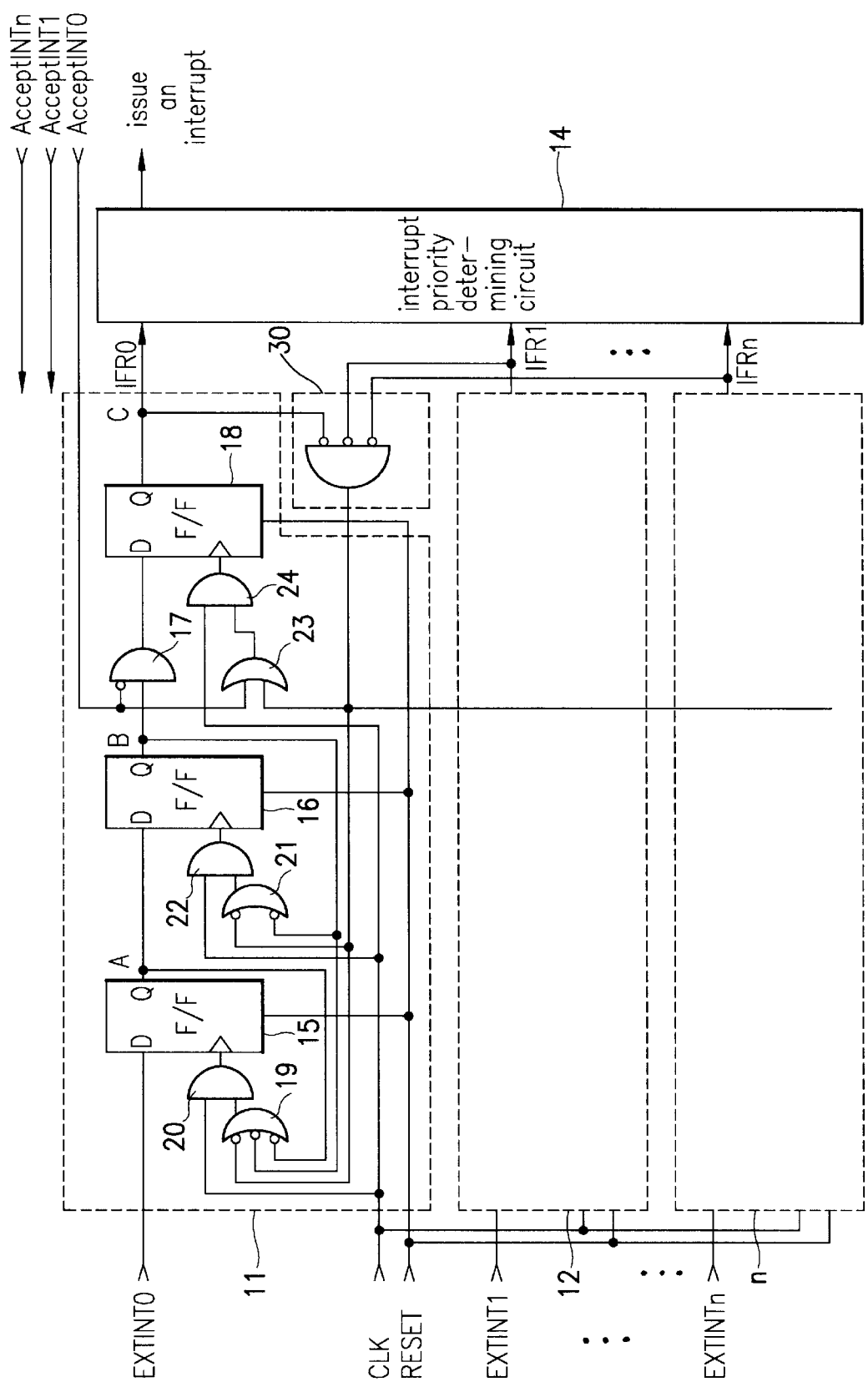
FIG. 3 illustrates a system of a multistage interrupt controller according to a preferred embodiment of the present invention; and, FIG. 4 illustrates a comparison of waveforms at different outputs of the multistage interrupt controller according to the preferred embodiment of the present invention illustrated in FIG. 3.

FIG. 3 illustrates a multistage interrupt controller according to a preferred embodiment of the present invention. The preferred embodiment includes a plurality of multistage interrupt reception registers 11, 12, . . . n capable of multistage reception and temporary storage of corresponding external interrupt signals EXTINT0, EXTINT1, . . . EXTINTn to generate a corresponding plurality of delayed external interrupt signals IFR0, IFR1, . . . IFRn, and an interrupt priority determining circuit 14 capable of multistage reception of the delayed external interrupt signals IFR0, IFR1, . . . IFRn, from the multistage interrupt reception registers 11, 12, . . . n, and prioritization and processing of the delayed external interrupt signals IFR0, IFR1, . . . IFRn.

The preferred embodiment also includes a logical operator 30 that inverts the delayed external interrupt signals IFR0, IFR1, . . . IFRn generated by the multistage interrupt reception registers 11, 12, . . . n respectively, and performs a logical operation, thus subjecting the multistage interrupt reception registers 11, 12, . . . n, to a logical feedback signal. A device that receives an interrupt signal generated by the interrupt priority determining circuit 14 generates a plurality of accept signals AcceptINT0, AcceptINT1, . . . AcceptINTn based on the priority of the delayed external interrupt signals IFR0, IFR1, . . . IFRn.

Each of the multistage interrupt reception registers 11, 12, . . . n includes a first flip-flop 15, a second flip-flop 16, and a third flip-flop 18. The first flip-flop 15 receives and temporarily stores the external interrupt signal (e.g. EXTINT0) and generates a first flip-flop output signal A that is received by the second flip-flop 16 and an OR gate 19. The first flip-flop 15 operates in synchronization with an input of an AND gate 20 that receives from an external clock signal CLK at a first input and an output of the OR gate 19 at a second input. The OR gate 19 receives inverted outputs of the second and third flip-flops 15, 16 and the inverted feedback signal at first, second and third inputs, respectively, and generates the output to the AND gate The second flip-flop 16 receives and temporarily stores the first flip-flop output A in synchronization with an output of an AND gate 22, and generates a second flip-flop output B to each of an AND gate 17 coupled to the third flip-flop 18, the OR gate 19 and an OR gate 21. The AND gate 22 receives the external clock signal CLK at a first input and an output of the OR gate 21 at a second input. The OR gate 21 receives inverted outputs of the logical operator 30 and the second flip-flop output B at first and second inputs, respectively, and generates the output to the AND gate 22.

The third flip-flop 18 receives and temporarily stores an output of an AND gate 17 and an AND gate 24, and generates the delayed external interrupt signal (e.g., IFR0) that is received by the interrupt priority determining circuit 14 and the logic operator 30. The AND gate 17 receives the inverted accept signal (e.g., AcceptINT0) at a first input, and the second flip-flop output B at a second input.

The AND gate 24 receives the external clock signal CLK at a first input and an output of an OR gate 23 at a second input. The OR gate 23 receives the feedback signal from the logic operator 30 at a first input, and the accept signal (e.g., AcceptINT0) at a second input.

The logic operator 30 receives the inverted delayed external interrupt signals IFR0, IFR1 . . . IFRn of the corresponding multistage interruption registers 11, 12, . . . n, and generates the feedback signal based on a logical operation. In a preferred embodiment of the present invention, the logic operator 30 is an AND gate.

While the preferred embodiment of the present invention illustrates a plurality of multistage interrupt reception registers 11, 12, . . . n, each having three stages of interrupt signal capacity, the present invention is not intended to be limited to these configurations or number of stages. Additionally, the present invention is not limited to any specific number of multistage interrupt registers.

Figure 4:
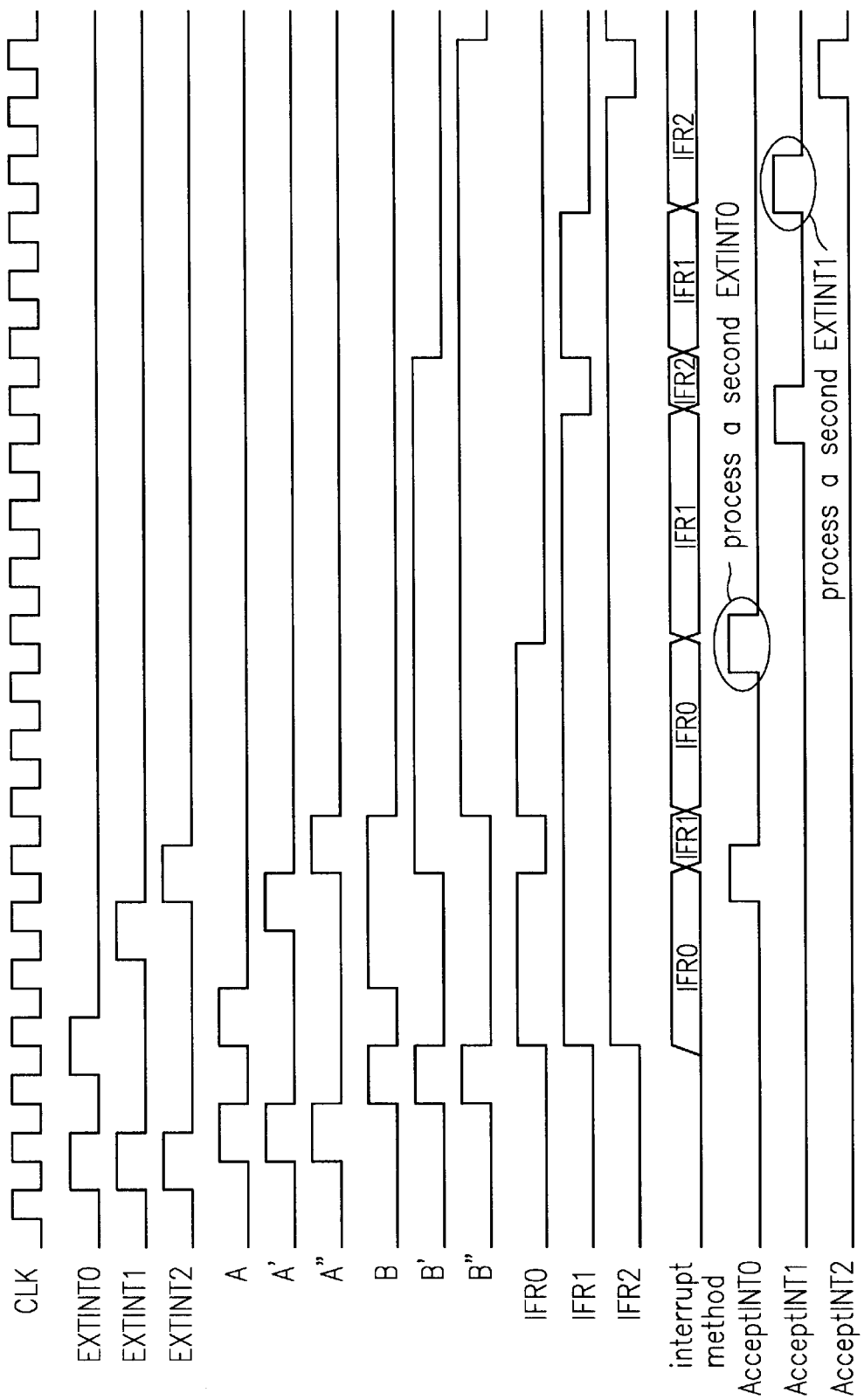

FIG. 4 illustrates waveforms at different outputs of the multistage interrupt controller according to the preferred embodiment of the present invention illustrated in FIG. 3. Upon reception of a reset signal RESET, the first, second and third flip-flops 15, 16, 18 in each of the multistage interrupt reception registers 11, 12, . . . n are initialized to a logic level of "0". Upon receiving the external interrupt signals EXTINT0, EXTINT1, . . . EXTINTn at a logic level of "1", each of the multistage interrupt reception registers 11, 12, . . . n generates a logic signal of "1" from the first, second and third flip-flops 15, 16, 18, respectively, to the interrupt priority determining circuit 14.

The interrupt priority determining circuit 14 generates interrupt signals according to a predetermined priority, even if all the delayed external interrupt signals IFR0, IFR1, . . . IFRn are received substantially simultaneously. For example, if the interrupt priorities are IFR0>IFR1>IFRn, then the interrupt priority determining circuit 14 generates the IFR0 signal when the IFR0 signal is at a logic level of "1". When the IFR0 signal is at a logic level of "0", and the IFR1 signal is at a logic level of "1", the interrupt priority determining circuit 14 generates the IFR1 signal. If a subsequent IFR0 signal is generated at a logic level of "1" while the interrupt priority circuit is generating the IFR1 signal, the IFR0 signal will be given immediate priority.

Further, the device accepting the delayed external interrupt signal IFR0, IFR1, . . . IFRn generates the accept signals AcceptINT0, AcceptINT1, . . . AcceptINTn at a logic level of "1" in accordance with the priority of the delayed external interrupt signals IFR0, IFR1, . . . IFRn. For example, upon reception of the accept signal AcceptINT0 at a logic level of "1", the AND gate 17 generates a logic signal of "0" to the third flip-flop 18. The third flip-flop 18 then generates a delayed external interrupt signal IFR0 at a "0" level at the next cycle.

Thus, even if the third flip-flop 18 is set at a logic level of "0" in response to the accept signal AcceptINT0 at the generation of a first interrupt signal from the interrupt priority determining circuit 14, if the same external signals EXTINT0 of a logic level of "1" are received successively, the logic level of "1" can be sustained by the second and third flip-flops 16, 18, to subsequently generate the interrupt signal IFR0. For example, Table 2 shows the external interrupt signals EXTINT0 generated twice.

TABLE 2

|  | 1 | 2 | 3 | 4 | 5 | 6 | 7 | 8 | 9 | 10 | 11 |
|---|---|---|---|---|---|---|---|---|---|---|---|
| EXTINT0 | 0 | 1 | 0 | 1 | 0 | 0 | 0 | 0 | 0 | 0 | 0 |
| A | 0 | 0 | 1 | 0 | 1 | 0 | 0 | 0 | 0 | 0 | 0 |
| B | 0 | 0 | 0 | 1 | 0 | 1 | 1 | 1 | 0 | 0 | 0 |
| C | 0 | 0 | 0 | 0 | 1 | 1 | 1 | 0 | 1 | 1 | 0 |
| interrupt issue | 0 | 0 | 0 | 0 | 1 | 1 | 1 | 0 | 1 | 1 | 0 |
| AcceptINT0 | 0 | 0 | 0 | 0 | 0 | 0 | 1 | 0 | 0 | 1 | 0 |

The external interrupt signals EXTINT0 generated at clock cycles 2 and 4 are accepted by the device receiving the interrupt signal at clock cycles 7 and 10, respectively. Unlike the related art interrupt reception register, the external interrupt signal EXTINT0 received at the clock cycle 4 is stored and processed, i.e., not discarded. Alternatively, if the external interrupt signals EXTINT0, EXTINT1, . . . EXTINTn are provided to the multistage interrupt reception registers 11, 12, . . . n embodied in the present invention at a substantially same time, the operation will occur, as shown in FIG. 4 as discussed hereafter.

FIG. 4 illustrates that if the interrupt signals IFR0, IFR1, . . . IFR2 are generated substantially simultaneously through the interrupt reception registers, 11, 12, . . . n, the interrupt signals are generated by the interrupt priority determining circuit 14 according to the priorities. If the external interrupt signals (e.g., EXTINT0) are provided twice or more in succession, the interrupt signals are generated in multiple stages, because the multistage interrupt reception registers 11, 12, . . . n store the successive interrupt signals temporarily before forwarding to the interrupt priority determining circuit 14. The number of external interrupt signals EXTINT0, EXTINT1, . . . EXTINTn that can be stored is proportional to the number of stages in each of the multistage interrupt registers 11,12, . . . n.

The multistage interrupt controller of the present invention has various advantages. For example, because the multistage interrupt controller of the present invention can receive the external interrupt signals regardless of the accept signal, the time-based degrees of freedom in issuance of the external interrupt signal can be increased in proportion to the number of stages in the registers. Thus, when an interrupt signal is generated twice or more in succession, the second through nth signals are not disregarded, wherein n represents a number of stages in each of the multistage interrupt reception registers.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A multistage interrupt controller, comprising:
    a plurality of multistage interrupt reception registers, each receiving and storing a plurality of interrupt signals to generate a priority interrupt signal;
    an interrupt priority determining circuit coupled to said plurality of multistage interrupt reception registers for receiving corresponding priority interrupt signals, determining priorities of the priority interrupt signals, and generating an output signal in accordance with the priorities;
    a feedback circuit that receives the priority interrupts signals from the multistage interrupt reception registers to generate a feedback signal to each of the plurality of multistage interrupt reception registers, wherein:
    each of the plurality of multistage interrupt reception registers comprises a plurality of stages coupled in series, wherein each of the stages receives the feedback signal and at least one of the interrupt signal and at least one delayed interrupt signal; and
    a first stage of the plurality of stages comprises:
        a first logic gate that receives the feedback signal, and at least one delayed interrupt signal and performs a logic operation to generate a first logic gate output;
        a second logic gate that performs a logic operation on the first logic gate output and a synchronization signal to generate a second logic gate output; and
        a flip-flop that receives a corresponding interrupt signal to generate the delayed interrupt signal in response to the second logic gate output.

2. The multistage interrupt controller of claim 1, wherein the first logic gate is an OR gate and the second logic gate is an AND gate.

3. The multistage interrupt controller of claim 1, wherein a last stage of the plurality of stages receives the feedback signal, the synchronization signal, an accept signal, and the delayed interrupt signal to generate a corresponding priority interrupt signal, wherein the accept signal is generated by a device that receives the output signal from the interrupt priority determining circuit.

4. The multistage interrupt controller of claim 3, wherein the last stage comprises:
    a first logic gate that performs a logic operation based on the accept signal and the feedback signal to generate a first logic gate output;
    a second logic gate that performs a logic operation based on the first logic gate output and the synchronization signal to generate a second logic gate output;

a third logic gate that performs a logic operation based on an inverted signal of the accept signal and the delayed interrupt signal of a prior stage to generate a third logic gate output; and a flip-flop that receives the third logic gate output to generate a corresponding priority interrupt signal in response to the second logic gate output.

5. The multistage interrupt controller of claim 4, wherein the first logic gate is an OR gate, and the second and third logic gates are AND gates.

6. The multistage interrupt controller of claim 1, wherein the feedback circuit comprises an AND gate.

7. The multistage controller of claim 1, wherein each of the plurality of multistage interruption registers comprises:

a plurality of flip-flops, each of the flip-flops generating a flip-flop output; and a plurality of logical gates coupled to corresponding flip-flops for performing a logical operation based on a synchronization signal, the feedback signal and at least one flip-flop output to generate one of a control signal and an input signal for each of the flip-flops, wherein the flip-flop output of a last flip-flop of the plurality of flip-flops is the priority interrupt signal.

8. The multistage interrupt controller of claim 1, wherein each of the multistage interrupt reception registers comprises:

a first flip-flop that receives and temporarily stores a corresponding interrupt signal and generates a first flip-flop output;

a second flip-flop, coupled in series to the first flip-flop, that temporarily stores the first flip-flop output and generates a second flip-flop output;

a first AND gate that receives an inverted signal of an accept signal, generated in accordance with the priorities, and the second flip-flop output and generates a first AND gate output;

a third flip-flop coupled in series to the first AND gate, that temporarily stores the first AND gate output and generates a third flip-flop output to the interrupt priority determining circuit and the feedback circuit;

a first OR gate that receives inverted first and second flip-flop outputs and the feedback signal and generates a first OR gate output;

a second AND gate, coupled to the first OR gate, that receives the first OR gate output and a synchronization signal and generates a second AND gate output to a control terminal of the first flip-flop;

a second OR gate that receives an inverted second flip-flop output and the feedback signal and generates a second OR gate output;

a third AND gate, coupled to the second OR gate, that receives the second OR gate output and the synchronization signal and generates a third AND gate output to a control terminal of the second flip-flop;

a third OR gate that receives the accept signal and the feedback signal to generate a third OR gate output; and a fourth AND gate coupled to the third OR gate, that receives the external clock signal and the third OR gate output and generates a fourth AND gate output to a clock terminal of the third flip-flop.

9. A multistage interrupt controller comprising:

a plurality of stages coupled in series, wherein each stage receives a feedback signal and at least one of an interrupt signal and at least one delayed interrupt signal and a last stage of the plurality of stages generates a priority interrupt signal;

a feedback circuit responsive to the priority interrupt signal to generate the feedback signal, wherein a first stage of the plurality of stages comprises:

a first logic gate that performs a logic operation based on the at least one delayed interrupt signal and the feedback signal to generate a first logic gate output;

a second logic gate that performs a logic operation based on the first logic gate output and a synchronization signal to generate a second logic gate output; and a flip-flop that receives a corresponding interrupt signal to generate the delayed interrupt signal in response to the second logic gate output.

10. The multistage interrupt controller of claim 9, wherein the first logic gate is an OR gate and the second logic gate is an AND gate.

11. The multistage interrupt controller of claim 9, wherein the last stage comprises:

a first logic gate that performs a logic operation based on an accept signal and the feedback signal to generate a first logic gate output;

a second logic gate that performs a logic operation based on the first logic gate output and a synchronization signal to generate a second logic gate output;

a third logic gate that performs a logic operation based on an inverted signal of the accept signal and the delayed interrupt signal of a prior stage to generate a third logic gate output; and a flip-flop that receives the third logic gate output to generate a corresponding priority interrupt signal in response to the second logic gate output.

12. The multistage interrupt controller of claim 11, wherein the first logic gate is an OR gate, and the second and third logic gates are AND gates.

13. The multistage interrupt controller of claim 9, wherein the multistage interruption register further comprises:

a plurality of flip-flops, each of the flip-flops generating a flip-flop output; and a plurality of logical gates coupled to corresponding flip-flops for performing a logical operation based on a synchronization signal, the feedback signal and at least one flip-flop output to generate one of a control signal and an input signal for each of the flip-flops, wherein the flip-flop output of a last flip-flop of the plurality of flip-flops is the priority interrupt signal.

14. The multistage interrupt controller of claim 9, wherein the multistage interrupt reception register further comprises:

a first flip-flop that receives and temporarily stores a corresponding interrupt signal and generates a first flip-flop output;

a second flip-flop, coupled in series to the first flip-flop, that temporarily stores the first flip-flop output and generates a second flip-flop output;

a first logic gate that receives an inverted signal of an accept signal and the second flip-flop output and generates a first logic gate output;

a third flip-flop coupled in series to the first logic gate, that temporarily stores the first logic gate output and generates the priority interrupt signal;

a second logic gate that receives inverted first and second flip-flop outputs and the feedback signal and generates a second logic gate output;

a third logic gate coupled to the second logic gate, that receives the second logic gate output and a synchronization signal and generates a third logic gate output to a control terminal of the first flip-flop;

a fourth logic gate that receives an inverted second flip-flop output and the feedback signal and generates a fourth logic gate output;

a fifth logic gate coupled to the fourth logic gate, that receives the fourth logic gate output and the synchronization signal and generates a fifth logic gate output to the control terminal of the second flip-flop;

a sixth logic gate that receives the accept signal and the feedback signal to generate a sixth logic gate output; and a seventh logic gate coupled to the sixth logic gate, that receives the synchronization signal and the sixth logic gate output to generate a seventh logic gate output to a control terminal on the third flip-flop.

15. The multistage interrupt controller of claim 14, wherein the first, third, fifth and seventh logic gate are AND gates, and the second, fourth and sixth logic gates are OR gates.

* * * * *